United States Patent
Weinerman (10) Patent No.: US 6,471,002 B1
(45) Date of Patent: Oct. 29, 2002

(54) FOLDING FOOT STEP WITH ANTI-SKID SURFACE

(75) Inventor: Lee S. Weinerman, Medina, OH (US)

(73) Assignee: The Eastern Company, Cleveland, OH (US)

( * ) Notice: Subject to any disclaimer, the term of this patent is extended or adjusted under 35 U.S.C. 154(b) by 0 days.

(21) Appl. No.: 09/729,048

(22) Filed: Dec. 4, 2000

(51) Int. Cl.⁷ .............. E04G 3/00; B60R 3/00
(52) U.S. Cl. .............. 182/91; 280/166; 182/90
(58) Field of Search .............. 182/91, 82, 98, 182/84, 135, 83, 90, 92, 97, 88, 89; 248/291.1, 314, 231.9, 308; 280/163, 165, 166; D12/203, 400; D25/62, 69, 68

(56) References Cited

U.S. PATENT DOCUMENTS

| | | |
|---|---|---|
| 120,517 A | 10/1871 | Henry |
| 413,312 A * | 10/1889 | Allen .............. 182/88 |
| 865,375 A | 9/1907 | Frye |
| 2,158,949 A | 5/1939 | Sarles et al. .............. 228/47 |
| 2,653,036 A | 9/1953 | Creel et al. .............. 280/166 |
| 2,678,832 A | 5/1954 | Wright .............. 280/167 |
| 3,171,671 A | 3/1965 | Cornett .............. 280/163 |
| 3,227,604 A | 1/1966 | Morgan .............. 161/162 |
| D218,203 S | 7/1970 | Vevea .............. D12/203 |
| 3,578,550 A | 5/1971 | Hoerner et al. .............. 161/162 |
| 3,627,350 A | 12/1971 | Cross .............. 280/166 |
| D229,045 S | 11/1973 | Woodall .............. D12/203 |
| 3,895,153 A | 7/1975 | Johnston et al. .............. 428/141 |
| 3,986,503 A | 10/1976 | LeGuillon .............. 182/89 |
| 4,121,691 A | 10/1978 | Poplawski .............. 182/90 |
| T977,005 I4 * | 12/1978 | Sidles, Jr. et al. .............. 280/163 |
| D263,132 S | 2/1982 | Mitchell .............. D12/203 |
| 4,336,293 A | 6/1982 | Eiden .............. 428/143 |
| 4,402,385 A | 9/1983 | Buche .............. 182/91 |
| 4,462,486 A | 7/1984 | Dignan .............. 182/91 |
| D276,716 S | 12/1984 | Dignan .............. D12/203 |
| 4,569,533 A | 2/1986 | Gronert et al. .............. 280/163 |
| D293,667 S | 1/1988 | Weiler .............. D12/203 |
| D296,321 S | 6/1988 | Hayes .............. D12/203 |
| D296,431 S | 6/1988 | Yont .............. D12/203 |
| RE33,104 E * | 10/1989 | Taylor .............. 248/231.9 X |
| D313,388 S | 1/1991 | Dale .............. D12/203 |
| D315,134 S | 3/1991 | Springer .............. D12/203 |
| D316,394 S | 4/1991 | Carr .............. D12/203 |
| D324,019 S | 2/1992 | Bailey .............. D12/203 |
| 5,312,150 A | 5/1994 | Quam .............. 296/62 |
| D361,319 S | 8/1995 | Orth, Sr. et al. .............. D12/203 |
| D381,948 S | 8/1997 | Schult .............. D12/203 |
| D397,979 S | 9/1998 | Graneto .............. D12/203 |

\* cited by examiner

*Primary Examiner*—Daniel P. Stodola
*Assistant Examiner*—Hugh B. Thompson
(74) *Attorney, Agent, or Firm*—David A. Burge (57) ABSTRACT

A folding foot step of the type used on vehicles has an improved anti-skid, friction grip, stand-on surface with a clover-leaflet-shaped perimeter. The stand-on surface is interrupted by three elongate openings that are spaced inwardly from the perimeter and arrayed to extend about an uninterrupted central region of the stand-on surface. An upwardly-opening recess is defined by a narrow upstanding rim that runs along and defines the perimeter of the stand-on surface, and by narrow upstanding rims that encircle the three openings. Anti-skid material is nested in the recess, covers the floor of the recess, and cooperates with the narrow upstanding rims to provide a stand-on surface that features a friction-grip texture in the central region and in regions of the stand-on surface located between the openings, and between the openings and the perimeter

44 Claims, 4 Drawing Sheets

FOLDING FOOT STEP WITH ANTI-SKID SURFACE

REFERENCE TO SUBJECT-MATTER RELATED APPLICATION

Reference is made to design application Ser. No. 29/133, 617, filed Dec. 4, 2000, now U.S. Pat. No. D 445,076 by Lee S. Weinerman entitle FOLDING STEP, and to design application Ser. No. 29/133,618. filed Dec. 4, 2000, now U.S. Pat. No. D 449,264 by Lee S. Weinerman entitle STEP POR-TIONS OF FOLDING STEP ASSEMBLY, which relate to appearance features that may be utilized in the practice of the present invention, the disclosures of which are incorporated herein by reference.

BACKGROUND OF THE INVENTION

1. Field of the Invention

The present invention relates to improvements in folding foot step assemblies of the type that are used on vehicles such as trucks and railroad cars to provide a convenient means to ascend and descend the vehicle. More particularly, the present invention relates to providing folding step assemblies with an improved anti-skid, friction grip, stand-on surface having a generally clover-leaflet-shaped perimeter, with the stand-on surface being interrupted by three elongate openings that are spaced from the perimeter and arrayed about an uninterrupted central region of the surface, with an upwardly-opening recess being defined by a narrow upstanding rim that runs along the perimeter of the stand-on surface and by narrow upstanding rims that encircle the openings, with anti-skid material nested in the recess, covering the floor of the recess, and cooperating with the narrow upstanding rims to provide a stand-on surface that features a friction-grip texture in the central region and in regions of the stand-on surface located between the openings and between the openings and the perimeter.

2. Prior Art

Large vehicles such as railroad and rail transit cars, trucks, fire trucks, trailers, motor homes, campers and the like require some means to facilitate climbing up and down the vehicle. Various devices have been proposed to facilitate ascending and descending such vehicles.

A folding foot step assembly for vehicles that has been in wide use for many years is described and illustrated in U.S. Pat. No. 4,462,486 issued Jul. 31, 1984 entitled FOLDING FOOT STEP, referred to hereinafter as the "Folding Step Patent," the disclosure of which is incorporated herein by reference. Reference also is made to U.S. Pat. No. D-276, 716 issued Dec. 11, 1984 entitled FOLDING STEP, which discloses an attractive appearance for a folding step.

The Folding Step Patent discloses a bracket member for mounting on the side of a vehicle, and a step member having a relatively wide front region that defines a stand-on surface located forwardly with respect to a relatively narrow rear region that is pivotally connected to the bracket member to enable the step member to pivot relative to the bracket member between an "extended" or "use" position and a "folded" or "storage" position. When the step member is in its extended or use position, the stand-on surface extends substantially horizontally and faces upwardly for being engaged by shoes and boots of those who use the folding step assembly to ascend or descend the side of the vehicle on which the folding step is mounted. When the step member is in its folded or storage position, the stand-on surface extends substantially vertically and faces toward the side of the vehicle—an orientation that minimizes the extent to which the folding step assembly projects away from the side of the vehicle.

The configuration of the stand-on surface, as defined by the perimeter of the step member disclosed in the Folding Step Patent, is much like that of a leaflet of a "three-leaflet" white clover plant commonly found in the lawns of midwestern America. More specifically, the perimeter of the stand-on surface is defined by opposite sides that diverge as they extend forwardly from the relatively narrow rear region of the step member (so as to increase the width of the stand-on surface as the stand-on surface extends forwardly from the relatively narrow rear region of the step member), and by a rounded, generally "C-shaped" front that connects smoothly with the opposite sides (at opposite "ends" of the "C" of the front) to complete the perimeter of the stand-on surface. Stand-on surfaces that have a perimeter of this character are referred to herein as being "clover-leaflet-shaped" and as having a "clover-leaflet shape."

The Folding Step Patent discloses a folding step assembly having a stand-on surface of clover-leaflet shape that is provided with a single relatively large, centrally located, kidney-shaped opening that is spaced from and substantially aligns with the curved C-shaped front of the step member. The kidney-shaped opening permits mud and other shoe- or boot-carried debris to escape when a shoe or boot is moved onto and pressed against the stand-on surface. Those who pivot the step member between its extended and folded positions also find the kidney-shaped opening to be useful in that it provides a passage through which the fingers of one hand can be inserted when it is necessary to grasp the step member to effect its pivotal movement.

While the referenced Folding Step Patent discloses the use of protruding diamond shaped elements on a cloverleaflet-shaped stand-on surface for the purpose of providing anti-skid characteristics, it is desirable to provide a significantly improved slip resistant, anti-skid, stand-on surface that is much less likely to permit the soles of shoes and boots to slip and slide thereon.

Other improvements that aid in providing an anti-skid surface also are desirable if they can be implemented without discarding the well accepted and well liked features of the folding step assembly disclosed in the Folding Step Patent, including the clover-leaflet shape of the stand-on surface and the advantages offered by the presence of a kidney-shaped opening that parallels the C-shaped front of the stand-on surface at a location spaced therefrom.

During recent years, significant effort has been devoted to the development of anti-skid materials that can be applied to exterior surfaces such as roadways, walkways and steps, and to interior surfaces such as the floors of bath tubs and shower stalls, as well as interior walkways and steps, to diminish unintended slippage thereon. This effort has resulted in the development of anti-skid formulations that can be applied as a spray or in liquid or paste form to surfaces where the newly applied material cures otherwise hardens over time, and in the development of adhesive-backed sheets of anti-skid material having a peel-off backing that enables the adhesive-backed sheets to be applied quickly and easily to surfaces to immediately provide desired anti-skid characteristics. Inasmuch as new types of anti-skid material and improvements in existing types of anti-skid material are steadily being developed, it is desirable to find an appropriate manner in which now-existing and newly developed forms of anti-skid material can be utilized on clover-leaflet-shaped folding step assemblies to enhance the anti-skid characteristics thereof without diminishing or distracting from other well accepted and advantageous features thereof, and while also providing other useful improvements therein.

SUMMARY OF THE INVENTION

The present invention addresses the foregoing and other drawbacks of the prior art by providing a folding step having a clover-leaflet-shaped stand-on surface that defines a wide-area recess wherein anti-skid material is nested. The recess is defined, at least in part, by a narrow rim that extends along the perimeter of the clover-leaflet-shaped stand-on surface to protect edge regions of the anti-skid from edge abrasion and/or from being peeled off of the step member.

The provision of a folding step assembly of the type having a clover-leaflet-shaped stand-on surface with anti-skid material nested in a wide-area recess bordered by a narrow, upstanding, perimetrically extending rim represents one novel feature of the present invention. The provision of a wide-area recess (i.e., a recess that extends across the vast majority of the top surface of a metal step member except where rim formations are provided near edge regions thereof) constitutes an arrangement that can be used with a wide variety of present-day anti-skid materials, and is well suited for use with new anti-skid materials as they are developed.

In preferred practice, the clover-leaflet-shaped stand-on surface is interrupted not only by an elongate kidney-shaped opening that is spaced from and substantially parallels the curved C-shape front of the stand-on surface, but also by a pair of other elongate openings, each of which parallels one of the opposed sides of the stand-on surface that extend between the curved C-shaped front and the relatively narrow rear region of the step member. In preferred practice, these three elongate openings are spaced short distances from the perimeter of the stand-on surface, and are arrayed about an uninterrupted central region of the stand-on surface, with the recess that carries the anti-skid material extending across the central region, between the openings, and between the openings and the perimeter of the stand-on surface. These three openings preferably are of about the same size and all are designed and positioned to provide finger-receiving passages that can be used when one needs to grip the step member from the front or from either of the sides of thereof to pivot the step member between its extended and folded positions.

The provision of a clover-leaflet-shaped step member with three elongate openings wherein one is generally kidney-shaped (spaced from and paralleling the C-shaped front) and the other two are elongate and have rounded ends (each spaced from and paralleling a separate one of the opposed sides of the step member) to provide hand holds that can receive the figures of one's hand when a need exists to grasp the step to pivot it between its folded and extended positions, has proved to be quite a useful feature unto itself—a feature that is not limited to use with clover-leaflet-shaped step members that carry anti-skid material nested in an upwardly opening recess.

In preferred practice, the area of the stand-on surface and the combined area of the three elongate openings has a ratio of about two-to-one. While the stand-on surface is not limited to a particular size, in preferred practice the stand-on surface offers about 24 to about 25 square inches of upwardly facing support area to boots and shoes that engage it; and, the combined area of the three openings that interrupt the stand-on surface is within the range of about 12.0 to about 12.5 square inches so as to provide enough open space to enable mud and other shoe and boot-carried debris to discharge therethrough as shoes and boots are moved onto and pressed into engagement with the stand-on surface. The resulting ratio of approximately two-to-one can, of course, be preserved if the size of the stand-on surface is scaled up or down to provide step member sizes that are better suited to a particular application.

In preferred practice, the borders of the large-area recess that nests the anti-skid material are defined by relatively thin, upstanding rims that are at least as tall (they extend at least as far above the floor of the recess wherein the anti-skid material is nested) as is the average thickness of the anti-skid material. Because the anti-skid material is provided with a rough top surface that typically is defined by abrasive particles or the like held in place by a suitable binder (much like a sheet of coarse sandpaper), the thickness of the anti-skid material varies between the peaks and valleys between the abrasive particles. To protect edge regions of the anti-skid material from undue edge abrasion and/or from being peeled away from the floor of the recess, the upstanding rims preferably are at least as tall as the average thickness of the body of anti-skid material carried in the recess.

In preferred practice, the upstanding rims include a narrow, uninterrupted, upstanding rim that defines the perimeter of the stand-on surface (i.e., it extends along at least a majority of the lengths of the two opposite sides and the C-shaped front of the stand-on surface without interruption), and also includes narrow, uninterrupted, upstanding rims that ring (i.e., that extend in an uninterrupted fashion about at least a majority of the perimeters of) each of the three elongate openings (i.e, the kidney-shaped opening that is spaced from and substantially parallels the curved front, and the elongate openings that are spaced from and substantially parallel the f opposite sides of the stand-on surface). The linear length of these four rims preferably totals about 48 to about 52 inches which gives a narrow ridge of solid metal adjacent the perimeter of the stand-on surface and adjacent the perimeters of the three openings for directly engaging the soles of shoes and boots that are moved onto and pressed into engagement with the stand-on surface. This combination of lengthy reaches of narrow upstanding rim formations (that extend in a variety of directions as they wrap about the perimeters of the stand-on surface and the openings that interrupt the stand-on surface) and the wide-area friction grip surface provided by the recess-carried anti-skid material, taken together with the presence of an uninterrupted central region (of the anti-skid material that almost always engages shoes and boots supported by the stand-on surface) surrounded by three sizable elongate openings that permit shoe- and boot-carried debris to pass therethrough has been found during tests to provide a combination of features that cooperates to significantly enhance the slip-resistance of the step member in comparison with the folding step design that is disclosed in the referenced Folding Step Patent.

BRIEF DESCRIPTION OF THE DRAWINGS

These and other features, and a fuller understanding of the invention may be had by referring to the following description and claims, taken in conjunction with the accompanying drawings, wherein:

DESCRIPTION OF THE PREFERRED EMBODIMENT

Figure 1:
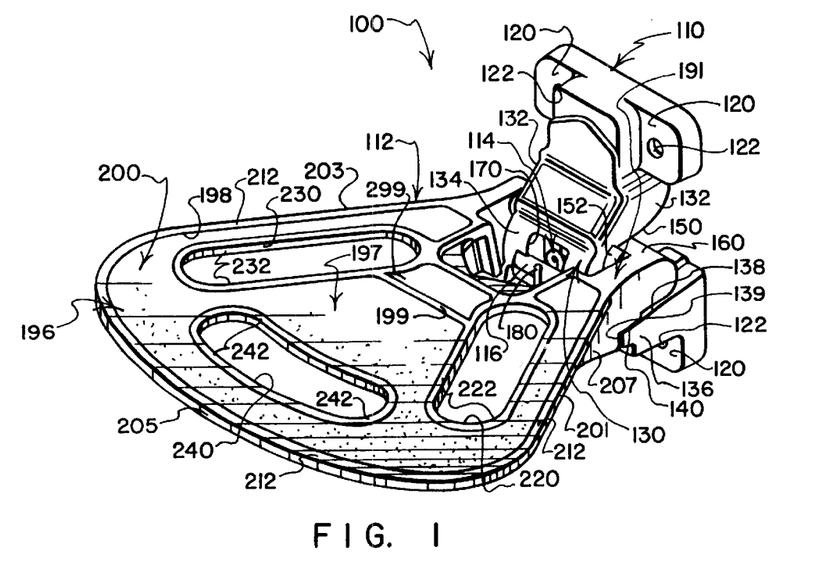
FIG. 1 is a perspective view of a folding step made in accordance with the present invention with the pivotally movable step thereof in its extended or use position.
Figure 2:
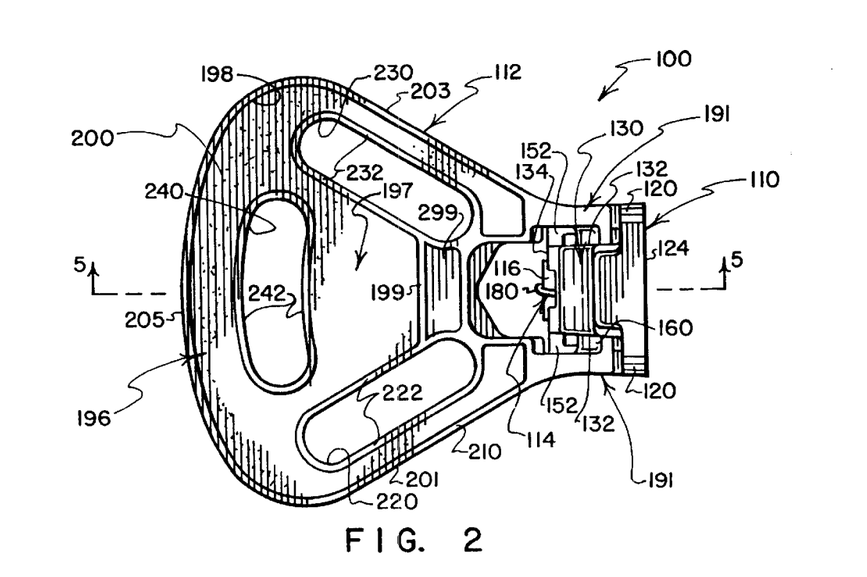
FIG. 2 is a top view thereof.

Referring to FIGS. 1 and 2, a folding step assembly 100 is shown for use on vehicles such as trucks, railroad transit vehicles and the like. The step assembly 100 includes a bracket member 110, a step member 112, and a coiled tension spring 114 that urges the bracket and step members 110, 112 together in a manner that permits the step member 112 to pivot relative to the bracket member 110 between an "extended" or "use" position shown in FIGS. 1, 2, 4 and 5, and a "folded" or "storage" position shown in FIGS. 6 and 7.

Figure 3:
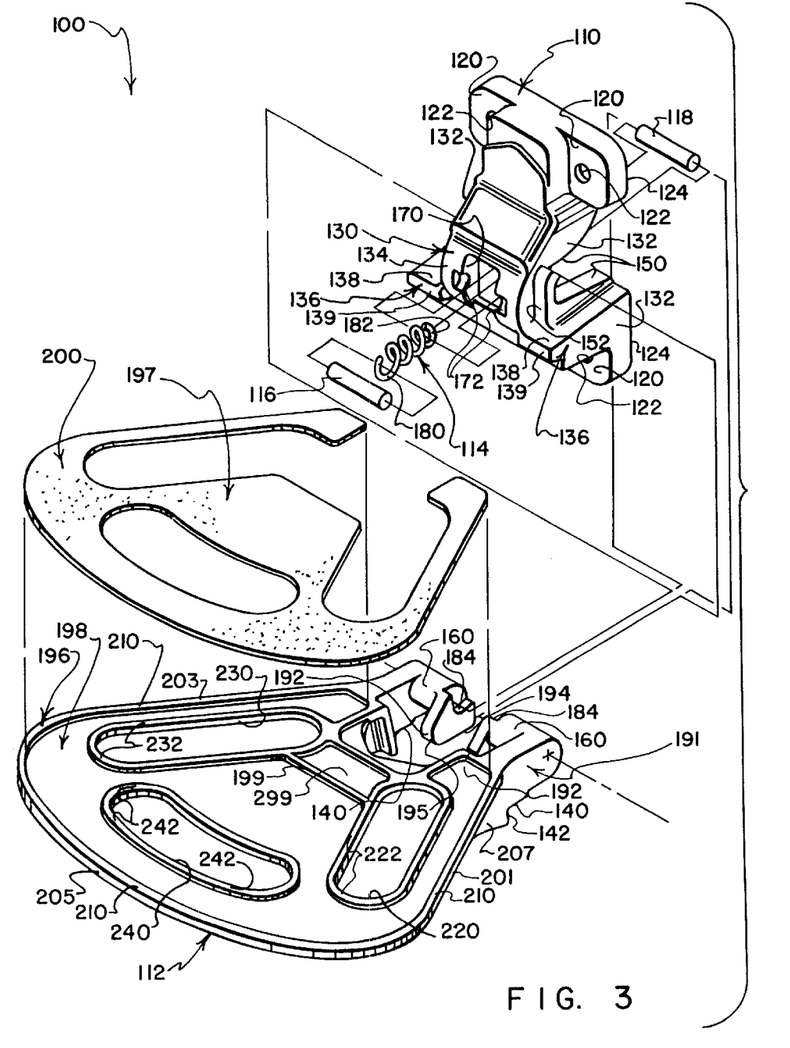
FIG. 3 is an exploded perspective view thereof.
Figure 4:
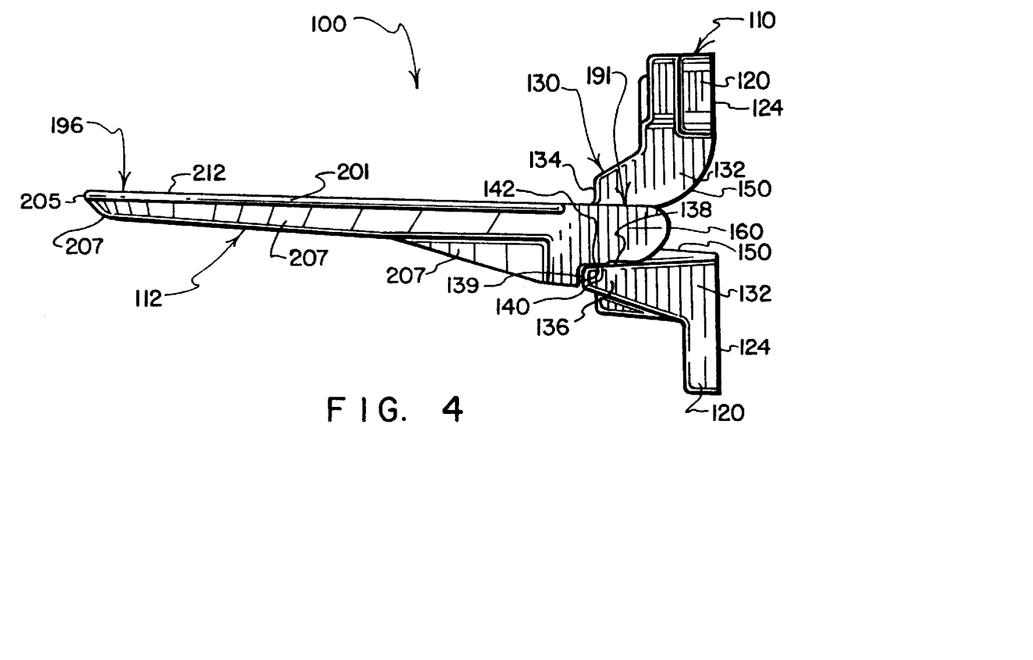
FIG. 4 is a right side view thereof, it being understood that the left side view is a mirror image of the right side view.
Figure 5:
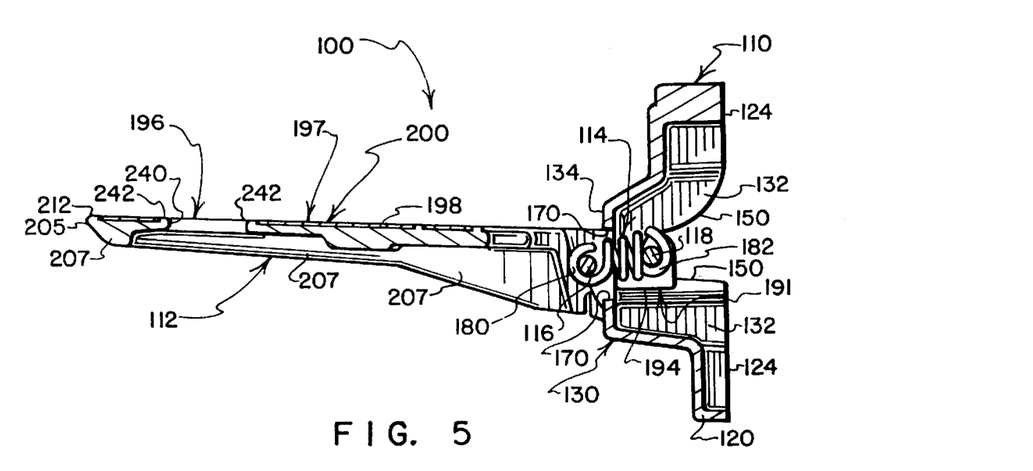
FIG. 5 is a sectional view as seen from a plane indicated by a line 5—5 in FIG. 2.

Referring to FIG. 3, the step assembly 100 also includes first and second spring connection pins 116, 118 that connect opposite ends of the spring 114 to the bracket and step members 110, 112, and a body of anti-skid material 200 that is nested in a complexly configured, upwardly-opening, wide-area recess 198. Elongate openings 220, 230, 240 are defined by the step member 112. A narrow upstanding rim 212 extends along opposite sides 201, 203 and along a C-shaped front 205 of the step member 122, and narrow upstanding rims 222, 232, 242 ring the openings 220, 230, 240. Taken together, the recess-carried body of anti-skid material 200 and the narrow upstanding rims 212, 222, 232, 242 define a clover-leaflet-shaped stand-on surface 196 that is located forwardly with respect to the rear region 191 of the step member 112.

The bracket member 110 has base portions 120 that define a plurality of mounting holes 122 for receiving fasteners such as cap screws (not shown) for clamping a back surface 124 of the bracket member 110 against a mounting surface such as may be defined by the side of a vehicle (not shown). The bracket member 110 also has a rearwardly opening box portion 130 that is bordered on opposite sides by side walls 132 which join with a complexly configured front wall 134. Aligned, rearwardly facing, U-shaped openings 150 are formed in the side walls 132. An opening 170 is formed through the front wall 134.

Located on opposite sides of the box portion 130 of the bracket member 110 are opposed, identically configured, oppositely extending flanges 136 that define upwardly facing support surfaces 138 and forwardly facing stop surfaces 139. The support surfaces 138 are engaged by bottom surfaces 140 of the step member 112 when the step member 112 is in its extended or use position. The stop surfaces 139 are engaged by identically configured, rearwardly-facing stop surfaces 142 of the step member 112 when the step member 112 is in its extended or use position. The upwardly facing support surfaces 138 and the forwardly facing stop surfaces 139 limit the pivotal extension movement of the step member 112 relative to the bracket member 110, and aid in supporting the step member 112 and such loads as may be applied thereto when the step member 112 is in its extended or use position.

Referring still to FIG. 3, the rearwardly facing U-shaped openings 170 are located slightly above the support surfaces 138. The U-shaped openings 170 have upper and lower surfaces that incline toward each other as they extend forwardly, and that curve toward each other at their forward ends to join smoothly to define surfaces that are engaged by generally cylindrical, inwardly extending stub shafts 160 of the step member 112. The stub shafts 160 are defined by a rear region 191 of the step member 112 which is located behind the clover-leaflet-shaped stand-on surface 196 of the step member 112. Because loads that are applied to the step member 112 are transmitted, at least in part, to the surfaces that define the forward end regions of the U-shaped openings 150 (by engagements of the stub shafts 160 therewith), forward end regions of the U-shaped openings 150 are strengthened and their surface areas are increased in size by formations 152 that extend transversely away from the side walls 132. Forwardly facing recesses 172 are provided on opposite sides of the front wall opening 170 of the bracket member 110 to receive opposite end regions of the first spring connection pin 116. A central region of the first spring connection pin 116 bridges across the opening 170 and receives a hook-shaped front end region 180 of the spring 114. The coiled body of the spring 114 extends rearwardly through the opening 170 to enable a hook-shaped rear end region 182 of the spring 114 to engage a central region of the second spring connection pin 118. Opposite ends of the second spring connection pin 118 are received in recesses 184 formed in cams 190 that are located at the inner ends of the stub shafts 160.

Figure 6:
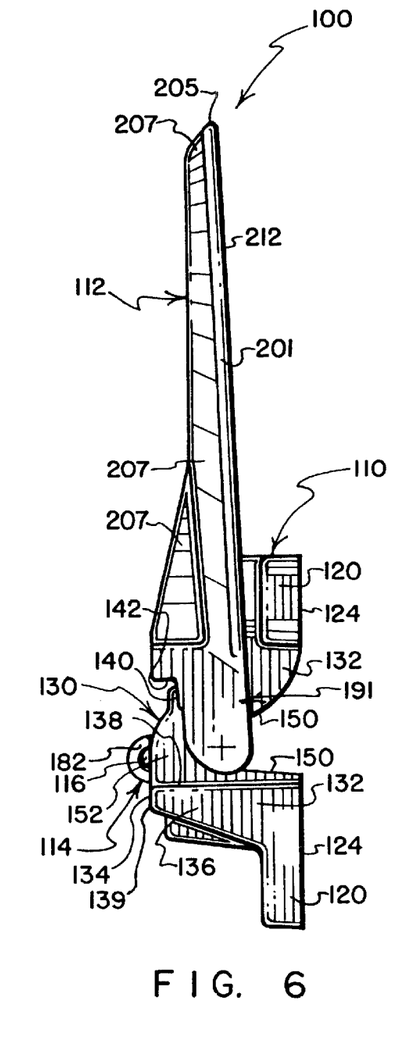
FIG. 6 is a right side view with the pivotally movable step in its retracted or storage position; and, FIG. 7 is a sectional view similar to FIG. 5 but with the step in the folded or storage position.
Figure 7:
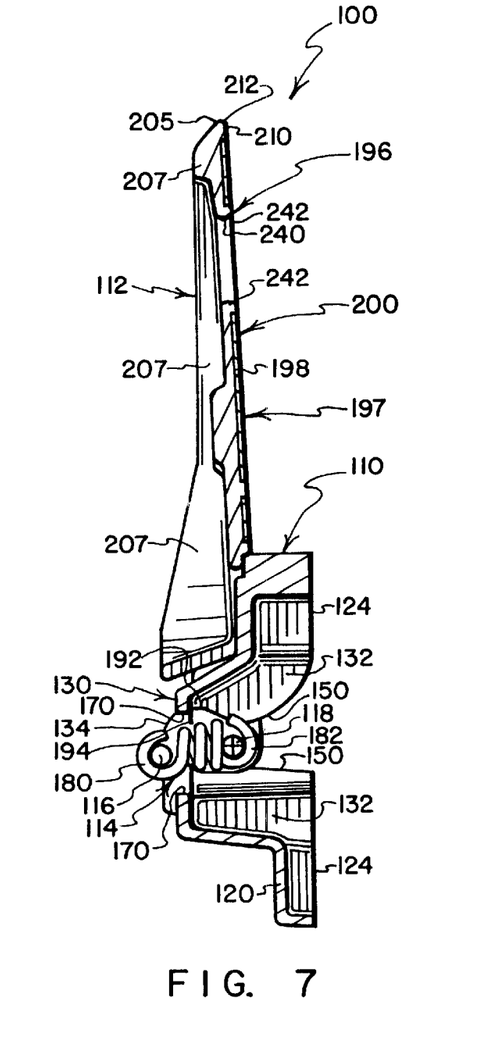

Referring still to FIG. 3, the cams 190 have identical short flat surfaces 192 that engage inner surface portions of the front wall 134 when the step member 112 is in its extended or use position (which position is shown in FIGS. 1, 2, 4 and 5), and identical, relatively longer flat surfaces 194 (one of which is depicted in FIG. 3) that engage inner surface portions of the front wall 134 when the step member 112 is in its folded or storage position (which position is shown in FIGS. 6 and 7). Identical rounded cam lobes 195 (one of which is depicted in FIG. 3) are provided at the junctures the surfaces 192, 194. The cam lobes 195 engage inner surface portions of the front wall 134 when the step member 112 is being pivoted between its extended and folded positions, and cooperate with the spring 114 to cause the step member 112 to be biased toward and detented toward its extended and folded positions in a manner well understood to those who are skilled in the art.

The clover-leaflet-shaped stand-on surface 196 has a perimeter that is bounded by the opposed sides 201, 203 which diverge as they extend forwardly from the rear region 191, and by a C-shaped front 205 that joins smoothly with the sides 201, 203. Underlying the perimeter of the stand-on surface 196 is a depending rib 207 (see FIGS. 4–7) that has a relatively small cross-section adjacent the front 205 (see FIGS. 5 and 7), and that tapers to increase in cross-section (see FIGS. 4 and 6) as it extends away from the front 205 toward the rear region 191 of the step member 112. The rearwardly-facing stop surfaces 139 are defined where the rib 207 joins the rear region 191.

Many of the folding step assembly components described above find mechanically and functionally equivalent components in the folding step assembly that is disclosed in the referenced Folding Step Patent. Differences between the folding step assembly 100 and the folding step assembly disclosed in the referenced Folding Step Patent reside principally in the configurations of the bracket and step members 110, 112, and in the provision of a complexly configured layer, coating, cover or body of anti-skid material 200 which is installed so as to nest within the complexly configured, upwardly-facing wide-area recess 198 of the step member 112.

Improvements in the bracket member 110 reside in the provision of the base portions 120 which define four mounting holes 122. When four fasteners (not shown) are installed in the four holes 122 to securely mount the bracket member 110 on the side wall of a vehicle (or other suitable mounting surface for the step assembly 100, not shown), the likelihood of the step assembly 100 being broken or torn away from its mounted position is diminished (in comparison with the bracket member disclosed in the referenced Folding Step Patent which utilizes only two threaded fasteners to connect it to a mounting surface).

Improvements in the step member 112 reside in the provision of a larger upwardly-facing stand-on surface 196 of generally clover-leaflet shape (i.e. a stand-on surface that is larger in size than, and has a shape that is much like the shape of, the stand-on surface that is defined by the perimeter of the folding step member disclosed in the referenced Folding Step Patent) for engaging the shoes or boots of a person who is supported by the folding step assembly 100; in the provision of the three elongate openings 220, 230, 240 that open through the stand-on surface 196 to provide passages through which mud and other debris carried by shoes or boots may escape as a boot or shoe is moved onto and is pressed against the stand-on step surface 196, with the openings 220, 230, 240 preferably being of a substantially equal size that will permit the fingers of one hand to be inserted therethrough when the step member 112 needs to be grasped to pivot it between the extended and folded positions, with each of the openings being spaced a short distance from and substantially paralleling a separate one of the front and the opposite sides of the perimeter of the stand-on surface 196, and with the openings 220, 230, 240 being arrayed on opposite sides of and at the front of an uninterrupted anti-skid-material-covered central region 197 of the stand-on surface 196; and, in the provision of the wide-area recess 198 (which is bordered by a rim 212 that extends along the sides 201, 203 and along the front 205 of the stand-on surface 196 and by rims 222, 232, 242 that extend around the openings 220, 230, 240, respectively, to define the major boundaries of the recess 198) which receives and nests the anti-skid material 200 to provide a layer, coating, cover or body of anti-skid material that extends across the central region 197 and across such regions of the stand-on surface 196 as are located between the rims 222, 232, 242 of the openings 220, 230, 240, and between the perimeter rim 212 of the stand-on surface 196 and the rims 222, 232, 242 of the openings 220, 230, 240.

Because modern-day workmen and workwomen wear shoes and boots that often have larger bottom surface areas than was the case a decade ago, providing the step member 112 with a larger upwardly-facing stand-on surface 196 is desirable both to ensure good stand-on support and to increase the contact area between the stand-on surface 196 and such boots and shoes as are engaged therewith to minimize slippage therebetween. The generally cloverleaflet shape of the stand-on surface of the step disclosed in the referenced Folding Step Patent is preserved, but its size, and the layout and number of the elongate openings that are formed therethrough.

Referring to FIGS. 1–3, the rims 222, 232 that surround the openings 220, 230 are joined toward the rear of the stand-on surface 196 by a transversely extending reach of rim 199. Located rearwardly of the reach of rim 199 is small area 299 of the stand-on surface 196 that can be used to provide printed information (not shown).

In preferred practice, the area of the stand-on surface 196 (i.e., the area that is bounded by the sides 201, 203 and the front 205, excluding the areas of the openings 220, 230, 240) is about 24.0 to about 25.0 square inches, with about 24.6 square inches being preferred; and, the combined area of the openings 220, 230, 240 is about 12.0 to about 12.5 square inches, with about 12.3 square inches being preferred; which gives a ratio of area of the stand-on surface 196 to the area of the openings 220, 230, 240 of about two-to-one. This relative arrangement preferably is achieved by providing an insert 200 of adhesive-backed anti-skid that has a maximum side-to-side width of about 8.5 inches and a maximum front-to-rear dimension of about 7.0 inches, with the shape of the anti-skid material insert 200 conforming in a proportional manner to the shape depicted in FIG. 2. The rims 212, 222, 232, 242 preferably are of uniform width, typically about 0.125 inches, and extend to a uniform height above the floor of the recess 198 that preferably equals about the average thickness of the anti-skid insert 200.

While the size and specific dimensions of step members that embody the preferred practice of the present invention can be increased, diminished or otherwise adjusted and modified without departing from the scope and spirit of the claimed invention, the arrangement described in the paragraph just above represents the best mode known to the inventor for carrying out the preferred practice of the invention.

The precise anti-skid material selected to be nested in the recess 198 (and securely bonded to the floor of the recess 198) is not a key element of this invention inasmuch as new and improved anti-skid materials are constantly being developed. What the present invention provides is the relatively wide-area recess 198 which can be employed to receive and protectively nest therein (to avoid undue edge wear and/or unwanted peeling of the anti-skid material from the floor of the recess 198) any of a wide variety of present-day anti-skid materials as well as new anti-skid materials that may be substituted for present-day materials as new and improved anti-skid materials are developed.

While the anti-skid material 200 is depicted as taking the form of an "insert" that has been die-cut or stamped from a sheet of adhesive backed anti-skid material of the type having adhesive on a back side of a strong backing material with adhesive particles and a suitable binder applied to the front side thereof, those who are skilled in the art will readily understand that the recess 198 can be utilized equally well to receive and nest other forms of anti-skid material that may or may not include a backing, for example mixtures of anti-skid material that can be applied as a spray or in a liquid or paste form that cures or otherwise hardens in-situ to provide a friction-grip surface of abrasive particles or the like supported by a binder or other suitable means that will hold the abrasive particles in place and to give an anti-skid surface capable of providing a lengthy and reliable service life.

One suitable type of anti-skid material that can be used to form the anti-skid insert 200 utilizes a thin, conformable aluminum sheet coated with medium sized silicon carbide particles on one side and a pressure sensitive adhesive on the other side, and has a nominal thickness of 0.87 mm. Another suitable type utilizes a conformable plastic film coated with medium sized silicon carbide particles on one side and a pressure sensitive adhesive backing on the other side, and has a nominal thickness of 0.74 mm.

Present-day sources of suitable commercially available adhesive-back anti-skid materials (of the type described in the paragraph just above) that can be die-cut or stamped to form inserts of the type indicated by the numeral 200 include Jessup Manufacturing Company of McHenry, Ill. 60050 (their product is referred to by the designation "Jessup Safety Track No. 3200 Coarse"); and Minnesota Mining and Manufacturing Company (their products are referred to by the designations "Safety Walk" and "General Purpose Safety Walk," and are described in greater detail in a number of patents including U.S. Pat. No. 3,578,550 (Hoerner et al), U.S. Pat. No. 3,895,153 (Johnston et al) and U.S. Pat. No. 3,227,604 (Morgan), the disclosures of which are incorporated herein by reference. Also worthy of mention is U.S. Pat. No. 4,336,293 (Eiden) which discusses the subject matter of tile three patents identified just above, the disclosure of which also is incorporated herein by reference.

As will be apparent from the foregoing discussion taken in conjunction with what is depicted in the drawings and what is described in the claims that follow, the present invention offers an improved folding step assembly with a step member having a generally clover-leaflet-shaped stand-on surface that preferably is interrupted by a plurality of elongate openings, wherein an upstanding rim that perimetrically rings a majority of the stand-on surface borders an upwardly-facing wide-area recess that nests a body of anti-skid material, with the openings that interrupt the stand-on surface also being ringed by upstanding rims, whereby the anti-skid characteristics of the resulting stand-on surface are significantly enhanced. Other enhancements flow from the use of three elongate openings of substantially equal size (adequate to receive the fingers of one's hand) that are spaced from and extend substantially parallel to opposed sides and a curved, C-shaped front of the stand-on surface, with the openings arrayed about a sizable uninterrupted central region of the anti-skid material, and with the anti-skid material also extending between the rims that ring the openings and between the perimetrically extending rim and the rims that ring the openings; with the most preferred practice of the invention providing a boot and shoe engagement surface having about 24 to about 25 square inches of area, with the openings having a total combined area of about 12 to about 12.5 square inches (so that a ratio of the area of the stand-on engagement surface to the area of the openings is about two-to-one), and with the total length of the rims preferably being about 48 to about 52 inches whereby lengthy reaches of narrow, upstanding metal rim material are provided to engage shoes and boots supported by the stand-on surface, with the rims also serving to protect edge regions of the anti-skid material from excess wear and/or from peeling away from the floor of the recess; and, with the forward-most of the three openings preferably being of kidney-shape so as to substantially parallel tile curved C-shaped front of the step to preserve features of the widely accepted and distinctive clover-leaflet-shaped configuration disclosed in the referenced Folding Step Patent.

Although the invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed. It is intended to protect whatever features of patentable novelty exist in the invention disclosed.

What is claimed is:

1. A folding step assembly having a folding step member pivotally connected to a bracket member for movement relative thereto between an extended position and a folded position, wherein the step member, when in the extended position, defines an upwardly-facing stand-on surface defined by a front region of the step member that is located forwardly with respect to a rear region of the step member that is pivotally connected to the bracket member, wherein the front region has a front that joins with a pair of opposed sides that extend from the front toward the rear region, wherein the stand-on surface is interrupted by a first opening formed through the front region of the step member and sized to receive fingers of one's hand to enable one to grasp the step member to pivot the step member between the extended position and the folded position, and wherein the stand-on surface includes a first upstanding rim portion that extends along a majority of the length of the perimeter of the front region defined by the opposed sides and the front, and a second upstanding rim portion that encircles the first opening, with the upstanding rim portions cooperating to define a recess that nests a body of anti-skid material that extends between adjacent ones of the upstanding rim portions.

2. The folding step assembly of claim 1 wherein the stand-on surface is of clover-leaflet-shaped configuration, and the first upstanding rim portion that extends along a majority of the length of the perimeter of the front region extends in an uninterrupted manner along a majority of the length of the perimeter of the clover-leaflet-shaped stand-on surface.

3. The folding step assembly of claim 2 wherein the opposed sides diverge as they extend forwardly from the rear region, and the front has a C-shape that connects smoothly with the opposed sides.

4. The folding step assembly of claim 3 wherein the stand-on surface is interrupted by a second opening formed through the front region, and wherein the second opening is encircled by an upstanding rim that cooperates with said first and second rim portions to define the recess.

5. The folding step assembly of claim 4 wherein a floor surface of the recess extends from the first upstanding rim portion that extends along a majority of the length of the perimeter of the front region to the second upstanding rim portion that encircles the first opening and to the upstanding rim that encircles the second opening, and wherein the body of anti-skid material is bonded to the floor surface.

6. The folding step assembly of claim 3 wherein the first opening is kidney-shaped and is spaced from and substantially parallels the C-shaped front.

7. A folding step assembly having a folding step member pivotally connected to a bracket member for movement relative thereto between an extended position and a folded position, wherein the step member, when in the extended position, defines an upwardly-facing recess bordered by a relatively thin upstanding rim, and a body of anti-skid material is nested in the recess for cooperating with the upstanding rim to define a stand-on surface; wherein the stand-on surface is of clover-leaflet-shaped configuration, and the thin upstanding rim includes a rim portion that extends in an uninterrupted manner along a majority of the length of the perimeter of the clover-leaflet-shaped stand-on surface; wherein the step member has a rear region that is pivotally connected to the bracket member, and the stand-on surface is located forwardly with respect to the rear region, with the clover-leaflet-shaped configuration of the stand-on surface being defined by a pair of opposed sides that diverge as they extend forwardly from the rear region, and by a C-shaped front that connects smoothly with the opposed sides; wherein the stand-on surface is interrupted by at least one elongate opening that provides a passage for shoe- and boot-carried debris to discharge as shoes and boots are moved onto and pressed into engagement with the stand-on surface; and, wherein the the stand-on surface also is interrupted by a pair of additional elongate openings, each of which is spaced from and substantially parallels a separate one of the opposed sides.

8. The folding step assembly of claim 7 wherein the thin upstanding rim includes a pair of additional upstanding rim portions each of which rings a separate one of the openings of the pair of additional elongate openings.

9. A folding step assembly having a folding step member pivotally connected to a bracket member for movement relative thereto between an extended position and a folded position, wherein the step member, when in the extended position, defines an upwardly-facing recess bordered by a relatively thin upstanding rim, and a body of anti-skid material is nested in the recess for cooperating with the upstanding rim to define a stand-on surface; wherein the stand-on surface is of clover-leaflet-shaped configuration, and the thin upstanding rim includes a rim portion that extends in an uninterrupted manner along a majority of the length of the perimeter of the clover-leaflet-shaped stand-on surface; wherein the step member has a rear region that is pivotally connected to the bracket member, and the stand-on surface is located forwardly with respect to the rear region, with the clover-leaflet-shaped configuration of the stand-on surface being defined by a pair of opposed sides that diverge as they extend forwardly from the rear region, and by a C-shaped front that connects smoothly with the opposed sides; wherein the stand-on surface is interrupted by first, second and third openings that provide passages for shoe- and boot-carried debris to discharge as shoes and boots are moved onto and pressed into engagement with the stand-on surface; wherein the first opening is of kidney shape and is spaced from and substantially parallels the C-shaped front, and wherein each of the second and third openings is spaced from and substantially parallels a separate one of the opposed sides.

10. The folding step assembly of claim 9 wherein the thin upstanding rim includes rim portions that ring the first, second and third openings.

11. The folding step assembly of claim 10 wherein the recess and the body of anti-skid material carried therein extends between adjacent ones of the rim portions that ring the first, second and third openings, and between the rim portion that extends in an uninterrupted manner along a majority of the length of the perimeter of the clover-leaflet-shaped stand-on surface.

12. The folding step assembly of claim 11 wherein the recess and the body of anti-skid material carried therein include an uninterrupted central region of the recess and an uninterrupted central region of the body of anti-skid material carried therein that have three sides that each are bordered, at least in part, by the rim portions that ring the first, second and third openings.

13. The folding step assembly of claim 12 wherein the stand-on surface also includes a relatively flat region located to the rear of the central region where information can be imprinted so as to be visible to those who view the stand-on surface.

14. In a folding step assembly comprising a bracket member, a step member that defines a clover-leaflet-shaped stand-on surface, a pivotal interconnection between the bracket and the step members, a spring connected between the bracket and step members urging the bracket and step members together under force at the pivotal interconnection, and a cam surface carried by the step member, continuously acting against the bracket member under the force of the spring, and shaped to increase the spring force during pivoting of the step member relative to the bracket member from both a folded and extended position, the improvement comprising a stand-on surface that is defined by a body of anti-skid material that is nested in a recess of substantially uniform depth defined at least in part by a substantially flat, upwardly facing floor of the step member that substantially parallels and closely underlies the stand-on surface, and by a narrow upstanding rim portion that extends upwardly from the flat floor and borders the recess and the body of anti-skid material that is nested in the recess, wherein the body of anti-skid material cooperates with the rim portion to define a majority of the stand-on surface.

15. The folding step assembly of claim 14 wherein the step member has a rear region that is pivotally connected to the bracket member, and the stand-on surface is located forwardly with respect to the rear region, with the clover-leaflet-shaped configuration of the stand-on surface being defined by a pair of opposed sides that diverge as they extend forwardly from the rear region, and by a C-shaped front that connects smoothly with the opposed sides, and wherein the narrow upstanding rim portion extends along the opposed sides and along the C-shaped front.

16. The folding step assembly of claim 15 wherein the stand-on surface is interrupted by at least one elongate opening that provides a passage for shoe- and boot-carried debris to discharge as shoes and boots are moved onto and pressed into engagement with the stand-on surface.

17. The folding step assembly of claim 15, wherein the at least one elongate opening includes an elongate, kidney-shaped opening that is spaced from and substantially parallels the C-shaped front.

18. The folding step assembly of claim 16 additionally including a thin upstanding rim that rings the at least one elongate opening.

19. In a folding step assembly comprising a bracket member, a step member that defines a clover-leaflet-shaped stand-on surface, a pivotal interconnection between the bracket and the step members, a spring connected between the bracket and step members urging the bracket and step members together under force at the pivotal interconnection, and a cam surface carried by the step member, continuously acting against the bracket member under the force of the spring, and shaped to increase the spring force during pivoting of the step member relative to the bracket member from both a folded and extended position, the improvement comprising a recess of substantially uniform depth defined at least in part by a substantially flat floor that parallels and closely underlies the stand-on surface, and by a narrow upstanding rim portion that extends upwardly from the flat floor and borders a majority of the perimeter of the clover-leaflet-shaped stand-on surface, with a body of anti-skid material being nested in the recess and cooperating with the rim portion to define a majority of the stand-on surface; wherein the step member has a rear region that is pivotally connected to the bracket member, and the stand-on surface is located forwardly with respect to the rear region, with the clover-leaflet-shaped configuration of the stand-on surface being defined by a pair of opposed sides that diverge as they extend forwardly from the rear region, and by a C-shaped front that connects smoothly with the opposed sides, and wherein the narrow upstanding rim portion extends along the opposed sides and along the C-shaped front; and wherein the stand-on surface is interrupted by first and second elongate openings that provide passages for shoe- and boot-carried debris to discharge as shoes and boots are moved onto and pressed into engagement with the stand-on surface; wherein each of the first and second elongate openings is spaced from and substantially parallels a separate one of the opposed sides.

20. The folding step assembly of claim 9 additional including a first thin upstanding rim that rings the first opening, and a second thin upstanding rim that rings the second opening.

21. In a folding step assembly comprising a bracket member, a step member that defines a clover-leaflet-shaped stand-on surface, a pivotal interconnection between the bracket and the step members, a spring connected between the bracket and step members urging the bracket and step members together under force at the pivotal interconnection, and a cam surface carried by the step member, continuously acting against the bracket member under the force of the spring, and shaped to increase the spring force during pivoting of the step member relative to the bracket member from both a folded and extended position, the improvement comprising a recess of substantially uniform depth defined at least in part by a substantially flat floor that parallels and closely underlies the stand-on surface, and by a narrow upstanding rim portion that extends upwardly from the flat floor and borders a majority of the perimeter of the clover-leaflet-shaped stand-on surface, with a body of anti-skid material being nested in the recess and cooperating with the rim portion to define a majority of the stand-on surface; wherein the step member has a rear region that is pivotally connected to the bracket member, and the stand-on surface is located forwardly with respect to the rear region, with the clover-leaflet-shaped configuration of the stand-on surface being defined by a pair of opposed sides that diverge as they extend forwardly from the rear region, and by a C-shaped front that connects smoothly with the opposed sides, and wherein the narrow upstanding rim portion extends along the opposed sides and along the C-shaped front; wherein the stand-on surface is interrupted by first, second and third elongate openings that provide passages for shoe- and boot-carried debris to discharge as shoes and boots are moved onto and pressed into engagement with the stand-on surface; wherein the first elongate opening is of kidney shape and is spaced from and substantially parallels the C-shaped front, and wherein each of the second and third elongate openings is spaced from and substantially parallels a separate one of the opposed sides.

22. The folding step assembly of claim 21 additionally including thin upstanding rim portions that ring each of the first, second and third elongate openings.

23. The folding step assembly of claim 22 wherein the recess and the body of anti-skid material carried therein extends between adjacent ones of the rim portions that ring the first, second and third elongate openings, and between the rim portion that extends along the opposed sides and along the C-shaped front.

24. The folding step assembly of claim 23 wherein the recess and the body of anti-skid material carried therein include an uninterrupted central region of the recess and an uninterrupted central region of the body of anti-skid material carried therein that have three sides that each are bordered, at least in part, by the rim portions that ring the first, second and third elongate openings.

25. The folding step assembly of claim 24 wherein the stand-on surface also includes a relatively flat region located to the rear of the central relatively where information can be imprinted so as to be visible to those who view the stand-on surface.

26. In a folding step assembly for use on a support, wherein the step apparatus includes a bracket member adapted to be fixed to the support, a step member that defines a clover-leaflet-shaped stand-on surface located forwardly with respect to a rear region of the step member, means for connecting the rear region of the step member to the bracket member for pivotal movement between extended and folded positions relative to the bracket member, and biasing means for acting between the step member and the bracket member for biasing the step member toward the extended and folded positions as the step member approaches these positions during pivoting of the step member relative to the bracket member, the improvement comprising a body of anti-skid material nested within a recess of substantially uniform depth defined at least in part by a substantially flat floor of the step member that underlies and supports the body of anti-skid material, and by a narrow upstanding rim portion of the step member that extends upwardly from the flat floor and borders the body of anti-skid material nested in the recess, and with the body of anti-skid material cooperating with the rim portion to define a majority of the stand-on surface.

27. The folding step assembly of claim 26 wherein the clover-leaflet-shaped configuration of the stand-on surface is defined by a pair of opposed sides that diverge as they extend forwardly from the rear region, and by a C-shaped front that connects smoothly with the opposed sides, and wherein the narrow upstanding rim portion extends along the opposed sides and along the C-shaped front.

28. The folding step assembly of claim 27 wherein the stand-on surface is interrupted by at least one elongate opening that provides a passage for shoe- and boot-carried debris to discharge as shoes and boots are moved onto and pressed into engagement with the stand-on surface.

29. The folding step assembly of claim 28 wherein the at least one elongate opening includes an elongate, kidney-shaped opening that is spaced from and substantially parallels the C-shaped front.

30. The folding step assembly of claim 29 additionally including a thin upstanding rim that rings the at least one elongate opening.

31. In a folding step assembly for use on a support, wherein the step apparatus includes a bracket member adapted to be fixed to the support, a step member that defines a clover-leaflet-shaped stand-on surface located forwardly with respect to a rear region of the step member, means for connecting the rear region of the step member to the bracket member for pivotal movement between extended and folded positions relative to the bracket member, and biasing means for acting between the step member and the bracket member for biasing the step member toward the extended and folded positions as the step member approaches these positions during pivoting of the step member relative to the bracket member, the improvement comprising a recess of substantially uniform depth defined at least in part by a substantially flat floor of the step member that parallels and closely underlies the stand-on surface, and by a narrow upstanding rim portion that extends upwardly from the flat floor and borders a majority of the perimeter of the clover-leaflet-shaped stand-on surface, with a body of anti-skid material being nested in the recess and cooperating with the rim portion to define a majority of the stand-on surface; wherein the clover-leaflet-shaped configuration of the stand-on surface is defined by a pair of opposed sides that diverge as they extend forwardly from the rear region, and by a C-shaped front that connects smoothly with the opposed sides, and wherein the narrow upstanding rim portion extends along the opposed sides and along the C-shaped front; wherein the stand-on surface is interrupted by three elongate openings that provides passages for shoe- and boot-carried debris to discharge as shoes and boots are moved onto and pressed into engagement with the stand-on surface; and, wherein the three elongate openings includes first and second elongate openings, each of which is spaced from and substantially parallels a separate one of the opposed sides.

32. The folding step assembly of claim 31 additionally including a first thin upstanding rim that rings the first opening, and a second thin upstanding rim that rings the second opening.

33. In a folding step assembly for use on a support, wherein the step apparatus includes a bracket member adapted to be fixed to the support, a step member that defines a clover-leaflet-shaped stand-on surface located forwardly with respect to a rear region of the step member, means for connecting the rear region of the step member to the bracket member for pivotal movement between extended and folded positions relative to the bracket member, and biasing means for acting between the step member and the bracket member for biasing the step member toward the extended and folded positions as the step member approaches these positions during pivoting of the step member relative to the bracket member, the improvement comprising a recess of substantially uniform depth defined at least in part by a substantially flat floor of the step member that parallels and closely underlies the stand-on surface, and by a narrow upstanding rim portion that extends upwardly from the flat floor and borders a majority of the perimeter of the clover-leaflet-shaped stand-on surface, with a body of anti-skid material being nested in the recess and cooperating with the rim portion to define a majority of the stand-on surface; wherein the clover-leaflet-shaped configuration of the stand-on surface is defined by a pair of opposed sides that diverge as they extend forwardly from the rear region, and by a C-shaped front that connects smoothly with the opposed sides, and wherein the narrow upstanding rim portion extends along the opposed sides and along the C-shaped front; wherein the stand-on surface is interrupted by three elongate openings that provide passages for shoe- and boot-carried debris to discharge as shoes and boots are moved onto and pressed into engagement with the stand-on surface; and, wherein the three elongate openings include a first elongate opening of kidney shape that is spaced from and substantially parallels the C-shaped front, and second and third openings each of which is spaced from and substantially parallels a separate one of the opposed sides.

34. The folding step assembly of claim 33 additional including thin upstanding rim portions that ring each of the three elongate openings.

35. The folding step assembly of claim 34 wherein the recess and the body of anti-skid material carried therein extends between adjacent ones of the rim portions that ring each of the three elongate openings, and between the rim portion that extends along the opposed sides and along the C-shaped front.

36. The folding step assembly of claim 35 wherein the recess and the body of anti-skid material carried therein include an uninterrupted central region of the recess and an uninterrupted central region of the body of anti-skid material carried therein that have three sides that each are bordered, at least in part, by the rim portions that ring the three elongate openings.

37. The folding step assembly of claim 36 wherein the stand-on surface also includes a relatively flat region located to the rear of the central region where information can be imprinted so as to be visible to those who view the stand-on surface.

38. A folding step assembly having a folding step member pivotally connected to a bracket member for movement relative thereto between an extended position and a folded position, wherein the step member, when in the extended position, defines an upwardly-facing stand-on surface of clover-leaflet-shaped configuration located forwardly with respect to a rear region that is pivotally connected to the bracket member, wherein the clover-leaflet-shaped configuration is defined by a pair of opposed sides that diverge as they extend away from the rear region, and by a C-shaped front that joins smoothly with the opposed sides, and wherein the stand-on surface is interrupted by three elongate openings, with one of the three elongate openings being of kidney shape, spaced from and substantially paralleling the C-shaped front, with each of the other elongate openings being spaced from and substantially paralleling a separate one of the opposed sides, and with all three of the elongate openings being sized to receive four fingers of one's hand to enable one to grasp the step member to pivot the step member between the extended and folded positions.

39. The folding step assembly of claim 38 wherein the stand-on surface includes a thin upstanding rim portion that extends along a majority of the length of the perimeter defined by the two sides and the C-shaped front, and thin upstanding rim portions that encircle the three openings, with the thin upstanding rim portions cooperating to define a recess that nests a body of anti-skid material that is bonded to a floor surface of the step member that extends between adjacent ones of the upstanding rim portions.

40. The folding step assembly of claim 39 wherein the height to which the thin upstanding rim portions extend above the floor surface being at least as great as the average thickness of the body of anti-skid material that is bonded to the floor surface.

41. The folding step assembly of claim 38 wherein the stand-on surface is defined at least in part by anti-skid material on an upwardly facing surface of the folding step member.

42. The folding step assembly of claim 38 wherein the stand-on surface is defined at least in part by anti-skid material bonded to an upwardly facing surface of the folding step member.

43. The folding step assembly of claim 38 wherein the stand-on surface includes an upstanding rim portion that extends along a majority of the length of the two sides and the C-shaped front, and upstanding rim portions that encircle the three openings, with the upstanding rim portions cooperating to define a recess that nests anti-skid material that extends between adjacent ones of the upstanding rim portions.

44. The folding step assembly of claim 38 wherein the stand-on surface includes an upstanding rim portion that extends along a majority of the length of the two sides and the C-shaped front, and upstanding rim portions that encircle the three openings, with the upstanding rim portions cooperating to define a recess that nests a body of anti-skid material that is bonded to a floor surface of the step member that extends between adjacent ones of the upstanding rim portions.

\* \* \* \* \*